(12) United States Patent
Wagner et al.

(10) Patent No.: US 11,897,244 B2
(45) Date of Patent: Feb. 13, 2024

(54) METHOD OF MAKING A NONWOVEN LAMINATE

(71) Applicants: Tobias Wagner, Cologne (DE); Patrick Bohl, Hennef (DE); Detlef Frey, Niederkassel (DE)

(72) Inventors: Tobias Wagner, Cologne (DE); Patrick Bohl, Hennef (DE); Detlef Frey, Niederkassel (DE)

(73) Assignee: REIFENHAEUSER GMBH & CO. KG MASCHINENFABRIK, Troisdorf (DE)

( * ) Notice: Subject to any disclaimer, the term of this patent is extended or adjusted under 35 U.S.C. 154(b) by 172 days.

(21) Appl. No.: 16/828,083

(22) Filed: Mar. 24, 2020

(65) Prior Publication Data

US 2020/0307146 A1 Oct. 1, 2020

(30) Foreign Application Priority Data

Mar. 26, 2019 (DE) .......................... 102019107771.0

(51) Int. Cl.
| | |
|---|---|
| B32B 5/02 | (2006.01) |
| B32B 5/26 | (2006.01) |
| B32B 27/32 | (2006.01) |
| B32B 37/00 | (2006.01) |
| B32B 37/06 | (2006.01) |
| D01F 6/06 | (2006.01) |
| D04H 3/007 | (2012.01) |
| D04H 3/16 | (2006.01) |
| B32B 38/00 | (2006.01) |

(52) U.S. Cl.
CPC ................ *B32B 5/022* (2013.01); *B32B 5/26* (2013.01); *B32B 27/32* (2013.01); *B32B 37/0076* (2013.01); *B32B 37/06* (2013.01); *B32B 37/156* (2013.01); *D01F 6/06* (2013.01); *D04H 3/007* (2013.01); *D04H 3/16* (2013.01); *B32B 2038/0028* (2013.01); *B32B 2250/03* (2013.01); *B32B 2250/20* (2013.01); *B32B 2250/242* (2013.01); *B32B 2262/0253* (2013.01); *B32B 2305/20* (2013.01); *B32B 2307/51* (2013.01); *B32B 2309/02* (2013.01); *D10B 2321/022* (2013.01)

(58) Field of Classification Search
None
See application file for complete search history.

(56) References Cited

U.S. PATENT DOCUMENTS

| 6,571,692 B1 * | 6/2003 | Downing | ............... B29C 31/006 100/329 |
| 2009/0098786 A1 * | 4/2009 | Tajima | ................. D04H 1/4291 264/291 |
| 2013/0239283 A1 | 9/2013 | Yokoyama | |

FOREIGN PATENT DOCUMENTS

| EP | 2022878 A1 * | 2/2009 | ........... D04H 1/4382 |
| WO | WO-2019203484 A1 * | 10/2019 | ........ A61F 13/51104 |

\* cited by examiner

*Primary Examiner* — Jacob T Minskey
*Assistant Examiner* — Adrianna N Konves
(74) *Attorney, Agent, or Firm* — Andrew Wilford

(57) ABSTRACT

A nonwoven laminate having at least two nonwoven layers is made by first spinning, cooling, and stretching, first crimped multicomponent filaments to form a first nonwoven web that is deposited on a deposition device. Then second continuous continuous filaments including an elastomer based on polypropylene are spun, cooled, and stretched to form a second nonwoven web that is deposited on the first nonwoven web and thereby forming the nonwoven laminate that it then consolidated.

13 Claims, 3 Drawing Sheets

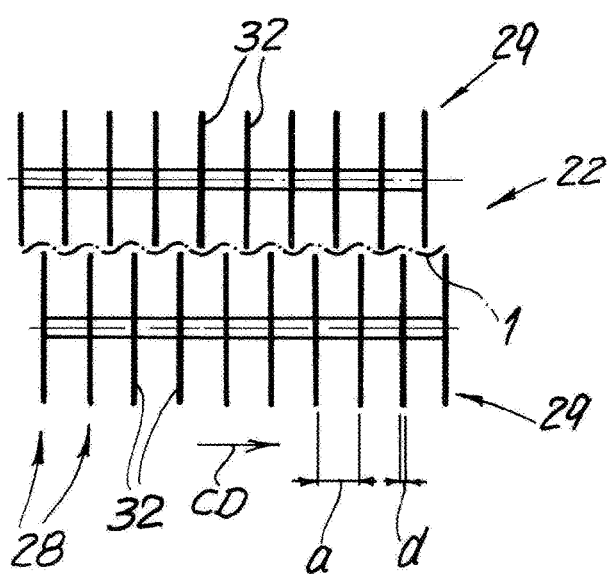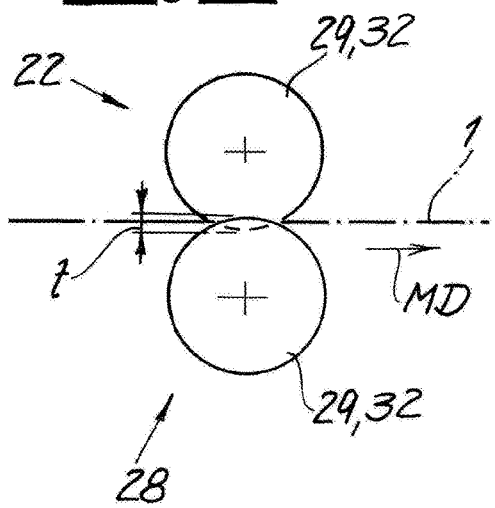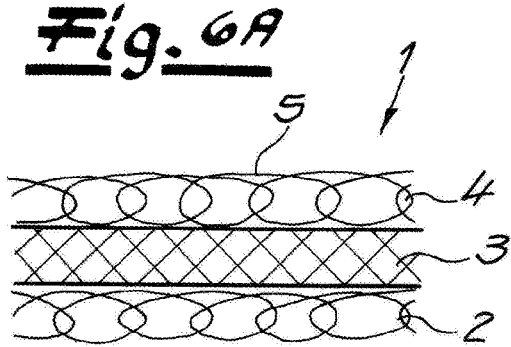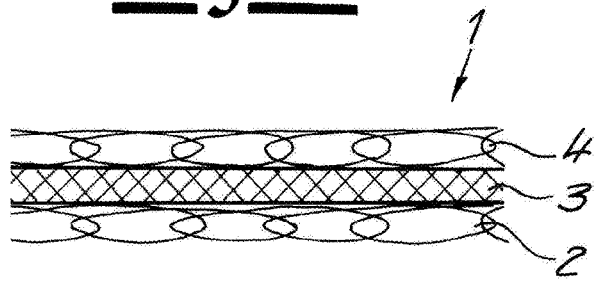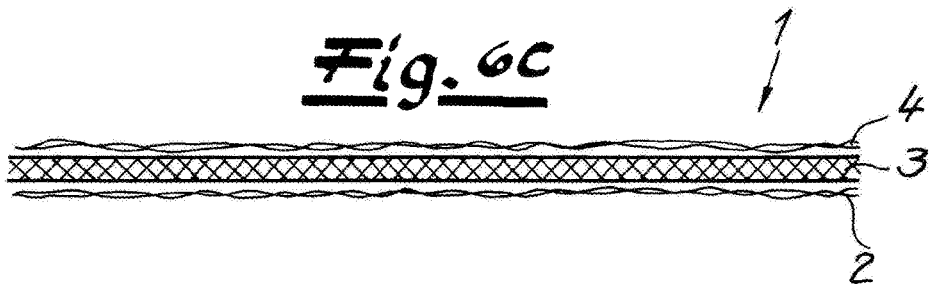

METHOD OF MAKING A NONWOVEN LAMINATE

FIELD OF THE INVENTION

The present invention relates to a method of making a nonwoven laminate. More particularly this invention concerns a method of making such a nonwoven laminate with at least two nonwoven layers as well as the nonwoven laminate itself.

BACKGROUND OF THE INVENTION

In making a nonwoven laminate with at least two nonwoven layers are formed as spunbonded layers by spinning each layer as continuous filaments from at least one spinneret. These filaments are then cooled, stretched, and finally deposited on a deposition device, in particular on a moving screen belt, to form the two nonwoven webs.

As is known, continuous filaments differ from staple fibers, which have much shorter lengths of, for example, 10 mm to 60 mm, because of their virtually endless length. The continuous filaments used in the invention are continuous filaments made of thermoplastic material.

Nonwoven laminates or spunbonded laminates of the type described above are known in practice in various embodiments. one often tries to produce nonwovens or nonwoven laminates with elastic properties. The nonwovens or nonwoven laminates should on the one hand be soft and stretchable and also have elastic restoring forces. Various measures are already known from the prior art for producing such elastic nonwovens.

A known measure is to achieve the elasticity of the nonwoven by embedding Lycra threads in the nonwoven structure. However, this embedding of the Lycra threads represents an additional process step and is relatively complex. In addition, the Lycra threads are visible in the nonwoven product, which is often not desirable. So the corresponding nonwoven web can be expanded, the Lycra threads must be applied to the nonwoven web in a tensioned state and the nonwoven is then usually installed in a laminate in a relaxed or shrunk state. Then there are disruptive folds in the nonwoven web when the Lycra threads return to their original state.

To make a nonwoven elastic, it is also known to produce a nonwoven web from a mixture of polypropylene fibers and fibers from thermoplastic polyurethane (TPU). The TPU fibers are responsible for the elastic properties of the nonwoven. When making a spunbonded nonwoven, the polypropylene fibers are intended to prevent the TPU fibers from sticking to the stretching passage or to the diffuser of the system after the fibers have been emitted by the spinneret, or from sticking to other fibers, thereby resulting in unsatisfactory fiber deposition. A disadvantage of this measure is that the polypropylene fibers have no elastic properties and hinder the stretching of the nonwoven. To ensure the elastic properties of the nonwoven, it must be stretched. To achieve a higher stretch, the original nonwoven structure is loosened or damaged. The polypropylene fibers are torn out of the bonding points during stretching, thereby loosening or destroying the bonding points. Another disadvantage is that thermoplastic polyurethane (TPU) is relatively expensive and, moreover, a mixture of TPU and polypropylene is difficult to recycle. TPU has the additional disadvantage that it sticks to hot surfaces of the rolls when the nonwoven is calendered. These known measures are therefore unsatisfactory.

Furthermore, a nonwoven laminate is known from US 2013/023283 that consists of an elastic core layer which is covered on both sides by stretchable nonwoven layers. This nonwoven laminate is stretched after it is made. To do this, the outer layers must have sufficient elasticity. With these known measures, however, a satisfactory compromise between the stretchability of the laminate, optimal elastic restoring forces and the softness of the laminate cannot be achieved.

Another known measure is that a stretched elastic plastic film is laminated to a nonwoven web made of filaments. The lamination of this elastic film represents an additional process step and is therefore creates extra work. Another disadvantage is that the properties of the nonwoven are influenced or determined by the laminated film. Due to the film, the laminate is not sufficiently permeable to air. In addition, the non-stretchable nonwoven is applied to the stretched plastic film during manufacture, so that later stretching of the plastic film is possible. This results in disruptive wrinkles.

OBJECTS OF THE INVENTION

It is therefore an object of the present invention to provide an improved method of making a nonwoven laminate.

Another object is the provision of such an improved method of making a nonwoven laminate that overcomes the above-given disadvantages, in particular that produces an end product that effectively avoids the disadvantages described above and that is sufficiently stretchable, has satisfactory elastic restoring forces, and also has a relatively high softness.

Another object of the invention is to provide a corresponding nonwoven laminate.

SUMMARY OF THE INVENTION

A method of making a nonwoven laminate having at least two nonwoven layers. The method has according to the invention the steps of spinning, cooling, and stretching first crimped multicomponent filaments to form a first nonwoven web;

depositing the first nonwoven web on a deposition device, and spinning, cooling, and stretching, second continuous filaments including an elastomer based on polypropylene to form a second nonwoven web, and depositing the second nonwoven web on the first nonwoven web and thereby forming the nonwoven laminate.

In other words, the invention teaches a method of making a nonwoven laminate with at least two nonwoven layers formed as spunbonded layers of continuous filaments spun by at least one spinneret to produce each spunbonded layer. The filaments are each cooled, stretched and finally deposited into a nonwoven web on a deposition device, in particular on a moving screen belt. The first spunbonded layer or a first spunbonded nonwoven is made from crimped multicomponent filaments, in particular from crimped bicomponent filaments, and the second spunbonded layer is made from continuous filaments having an elastomer based on polypropylene.

According to a preferred embodiment of the invention, the at least one second spunbonded layer or the at least one second spunbonded nonwoven is made from monocomponent filaments.

The continuous filaments or monocomponent filaments of the second spunbonded nonwoven preferably consist of an elastomer based on polypropylene or essentially of the elastomer based on polypropylene. The fact that these continuous filaments or monocomponent filaments essentially consist of the elastomer based on polypropylene means, in particular, that in addition to the elastomer, at least one additive can also be present in the continuous filaments or monocomponent filaments. The continuous filaments or monocomponent filaments expediently consist of at least 95% by weight, preferably at least 97% by weight and very preferably at least 98% by weight, of the elastomer based on polypropylene.

According to an alternative embodiment of the invention, the continuous filaments of the at least one second spunbonded nonwoven are bicomponent filaments that are preferably in the form of bicomponent filaments with a core-sleeve configuration, in particular with a coaxial core-sleeve configuration.

In the context of the method according to the invention, the first spunbonded layer of crimped filaments is first of all deposited on the deposition device or on the moving screen belt, and the second spunbonded layer is then deposited on the first spunbonded layer. A particularly preferred embodiment that is of particular importance in the context of the invention, is characterized in that a third spunbonded layer or a third spunbonded nonwoven is made from crimped multicomponent filaments, in particular from crimped bicomponent filaments. It is particularly preferred that the second spunbonded layer is between the first spunbond layer and the third spunbonded layer. In the course of production of the nonwoven laminate according to the invention, the first spunbonded layer is expediently first placed on the deposition device or on the moving screen belt, and then the second spunbonded layer is deposited on the first spunbonded layer. Finally, in the context of this preferred embodiment, the third spunbonded layer is deposited on the second spunbond layer, so that the second spunbonded layer represents the core layer sandwiched between the first and the third spunbonded layer.

It is within the scope of the method according to the invention that at least two, preferably at least three second spunbonded layers or second spunbonded nonwovens are made. These second spunbonded nonwovens or these second spunbonded layers form two or three core layers between the first and third spunbonded layers, so that an at least four-layer or five-layer nonwoven laminate is formed.

It is within the scope of the invention that the nonwoven laminate made according to the invention has an elastic elongation in at least one direction of at least 60% and preferably of at least 70%. Elongation or stretchability means in particular the ability to stretch the laminate without the laminate being damaged or without in particular the bonding points between the filaments being damaged or being damaged to a significant degree. The nonwoven laminate according to the invention is characterized by a combination of soft, stretchable nonwoven layers or outer layers of crimped filaments with at least one elastic core layer. Due to the crimping of the filaments of the outer nonwoven layers, high-loft outer layers are used. The combination of the high-loft nonwoven layers with the elastic core layer gives the nonwoven laminate optimal elastic behavior in all directions, even without additional activation in the form of stretching it. Due to the elastic properties of the nonwoven laminate on the one hand and the soft surface feel of the laminate on the other hand, the laminate is ideal for use in hygiene products, for example in diapers.

It is within the scope of the invention that the mass ratio of the second spunbonded layer or the elastic spunbonded layer to at least one of the spunbonded layers made of crimped filaments is 70:30 to 30:70. According to a highly recommended embodiment of the invention, the mass fraction of the second spunbonded layer or the elastic spunbonded layer is higher than the mass fraction of at least one spunbonded layer made of crimped filaments. The mass ratio between the second spunbonded layer or the elastic spunbonded layer and at least one spunbonded layer made of crimped filaments is expediently 50:60 to 40:50 and for example 55:45. The mass ratio of the second or the elastic spunbonded layer can be increased by using several spinnerets or several spinning beams for the second spunbonded layer.

It is recommended that the crimped filaments of the first spunbonded layer and/or the crimped filaments of the third spunbonded layer be designed as crimped filaments with an asymmetrical fiber configuration.

A particularly preferred embodiment, which is of particular importance with regard to attaining the inventive object, is characterized in that the crimped filaments of the first spunbonded layer and/or the crimped filaments of the third spunbonded layer are formed as crimped filaments with side-by-side configuration and/or with a core-sleeve configuration, in particular with an eccentric core-sleeve configuration. The crimped filaments of the first spunbonded layer and/or the crimped filaments of the third spunbonded layer are particularly preferably formed as crimped bicomponent filaments with side-by-side configuration and/or with core-sleeve configuration, in particular with an eccentric core-sheath configuration.

A recommended embodiment of the invention is characterized in that the crimped filaments of the first spunbonded layer and/or the crimped filaments of the third spunbonded layer have at least one component based on polypropylene and in particular based on homopolypropylene. At least one component of the crimped filaments expediently consists of polypropylene, in particular homopolypropylene or essentially polypropylene, in particular essentially homopolypropylene. Essentially, this means in particular that, in addition to polypropylene or homopolypropylene, the component can also have at least one additive. Appropriately, at least one component of the crimped filaments contains at least 95% by weight, preferably at least 96% by weight, of polypropylene or homopolypropylene. According to one embodiment variant, the at least one component of the crimped filaments contains at least one fatty-acid amide as an additive or as a lubricant, in particular eurucic-acid amide as an additive or as a lubricant. It is recommended that the at least one component have 1 to 3% by weight of fatty-acid amide, in particular eurucic-acid amide. Expediently, 1000 to 5000 ppm of additives or lubricants, preferably fatty-acid amide, in particular eurucic-acid amide, are contained in the component. The lubricant ensures in particular the soft feel of the first spunbonded layer and/or the third spunbonded layer.

A very preferred embodiment of the invention is characterized in that the crimped filaments of the first spunbonded layer and/or the crimped filaments of the third spunbonded layer have two components or at least two components based on polypropylene, in particular based on homopolypropylene. At least one component can also be a mixture of polypropylenes or homopolypropylenes. According to a recommended embodiment of the invention, two components or at least two components of the crimped filaments of the first spunbonded layer and/or the crimped filaments of the third spunbonded layer consist of polypropylene, in particular of homopolypropylene or essentially of polypropylene, in particular essentially of homopolypropylene. Each component preferably consists of at least 95% by weight, preferably at least 96% by weight, of polypropylene, in particular homopolypropylene. It is within the scope of the invention that two components or at least two components of the crimped filaments of the first spunbonded layer and/or the third spunbonded layer have at least one additive and preferably have at least one fatty-acid amide, for example eurucic-acid amide, as an additive or as a lubricant. The additive, in particular the fatty-acid amide and, for example, the eurucic-acid amide, is expediently present in the respective component in an amount of 1 to 3% by weight or 1000 to 5000 ppm. A particularly recommended embodiment of the invention is characterized in that the crimped filaments of the first spunbonded layer and/or the crimped filaments of the third spunbonded layer are designed as bicomponent filaments and that both components of the bicomponent filaments are made from polypropylene, in particular from homopolypropylene or substantially from polypropylene, in particular consist substantially of homopolypropylene. At least one component can also be a mixture of polypropylenes or homopolypropylenes.

It is within the scope of the invention that homopolypropylenes are used for at least one component or for the components of the crimped filaments of the first spunbonded layer and/or the crimped filaments of the third spunbonded layer are made which are based on Ziegler-Natta catalysts or based on metallocene catalysts. The molecular weight distribution (MWD) of the polypropylenes used for at least one component of the crimped filaments of the first spunbonded layer and/or of the crimped filaments of the third spunbonded layer is preferably 1.6 to 4.5. The molecular weight distribution is defined as Mw/Mn. It is recommended that the melting point of the lower melting component or the lowest melting component of the crimped filaments of the first spunbonded layer and/or the crimped filaments of the third spunbonded layer be above 140° C., preferably above 150° C.

A proven embodiment of the invention is characterized in that the crimped filaments of the first spunbonded layer and/or the crimped filaments of the third spunbonded layer each have two components or at least two components based on polypropylene, in particular based on homopolypropylene, and the two polypropylenes or homopolypropylenes of the two components differ in their melt-flow rate (MFR). The melt-flow rate of one component is preferably at least 1.2 times, expediently at least 1.3 times and preferably at least 1.4 times greater than the melt-flow rate of the other component. In the context of the invention, the melt-flow rate is, expediently measured in accordance with ISO 1133, 230° C./2.16 kp.

According to a recommended embodiment of the invention, the crimped filaments of the first spunbonded layer and/or the crimped filaments of the third spunbonded layer each have at least one component which contains a mixture of polypropylenes or preferably of homopolypropylenes. This at least one component expediently consists of this mixture of polypropylenes, in particular of homopolypropylenes or essentially of this mixture of polypropylenes, in particular of homopolypropylenes. This mixture preferably contains two polypropylenes, in particular two homopolypropylenes. It is within the scope of the invention that the melt-flow rate (MFR) of one polypropylene, in particular homopolypropylene, is greater than the melt-flow rate of the other polypropylene, in particular homopolypropylene. The melt-flow rate of one polypropylene, in particular homopolypropylene, is expediently at least 1.5 times, preferably at least 2 times, higher than the melt-flow rate of the second polypropylene, in particular homopolypropylene.

A particularly recommended embodiment, which is of particular importance in the context of the invention with regard to attaining the inventive object, is characterized in that the crimped filaments of the first spunbonded layer and/or the crimped filaments of the third spunbonded layer have a degree of crimp of more than 2.5 loops per cm of their length, preferably of more than 3 loops per cm of their length. Appropriately, both the crimped filaments of the first spunbonded layer and the crimped filaments of the third spunbonded layer have this preferred degree of crimp. The number of loops per cm length of the filaments is measured in particular according to the Japanese standard JIS L-1015-1981, by counting the crimps under a pretension of 2 mg/den in (¹⁄₁₀ mm), based on the stretched length of the filaments. A sensitivity of 0.05 mm is used to determine the number of loops or crimp loops.

It is within the scope of the invention that the titer of the crimped filaments of the first spunbonded layer and/or of the crimped filaments of the third spunbonded layer is in the range from 0.8 to 2.2 den, preferably in the range between 1.0 and 2.0 den.

A very recommended embodiment of the method according to the invention is characterized in that the first spunbonded layer of crimped filaments is first placed on the deposition device, in particular on the moving screen belt, and that this first spunbonded layer is then first consolidated or preconsolidated. The preconsolidation is expediently carried out with the aid of a calender and preferably with a surface temperature of the calender between 130° C. and 140° C., for example of 135° C. It is also within the scope of the invention that the third spunbonded layer made of crimped filaments is also preconsolidated and expediently preconsolidated under the same conditions as for the first spunbonded layer. Elongations of over 200% can be achieved for the first and/or for the third spunbonded layer.

It is within the scope of the invention that the continuous filaments, in particular the monocomponent filaments, of the second spunbonded layer consist or substantially consist of at least one elastomer. These continuous filaments or monocomponent filaments preferably consist of only one elastomer or substantially only one elastomer. A particularly preferred embodiment of the invention is characterized in that the at least one elastomer or the elastomer for the continuous filaments of the second spunbonded layer is a copolymer of propylene and ethylene. The proportion of propylene is preferably more than 60% by weight, preferably more than 70% by weight and very preferably more than 80% by weight. According to one embodiment variant, the melt-flow rate (MFR) of the at least one elastomer or the elastomer of the second spunbonded layer is 10 g/10 min to 30 g/10 min and preferably 15 g/10 min to 25 g/10 min. The melt-flow rate is preferably measured according to ISO 1133, 230° C./2.16 kp. A very recommended embodiment of the invention is characterized in that the elastomer or the copolymer used as the elastomer has a melting point between 50° C. and 170° C., preferably between 50° C. and 160° C., particularly preferably between 50° C. and 130° C.

Of particular importance in the context of the invention is an embodiment according to which the polypropylene of the elastomer or the copolymer of the continuous filaments, in particular the monocomponent filaments of the second spunbonded layer, has a mesopentad fraction (mmmm) of more than 70%, preferably of more than 80% and preferably of more than 90%. It is within the scope of the invention that the elastomer is a low-crystalline isotactic copolymer with a mesopentad fraction (mmmm) of polypropylene of more than 70%, preferably more than 80% and very preferably more than 90%. Advantageously, the continuous filaments or monocomponent filaments of the second spunbonded layer are manufactured with a titer of 10 μm to 50 μm, preferably from 20 μm to 50 μm, preferably from 20 μm to 45 μm, particularly preferably from 25 μm to 45 μm and very particularly preferably from 25 μm to 40 μm.

When making the continuous filaments or monocomponent filaments for the second spunbonded layer, a thread speed in the range from 500 m/min to 1500 m/min is preferred. A particularly recommended embodiment of the invention is characterized in that the second spunbonded layer is not preconsolidated or is not preconsolidated by calendering. It is therefore within the scope of the invention that the fiber deposition is not preconsolidated or is not preconsolidated by calendering after the second spunbonded layer has been deposited.

Furthermore, it is within the scope of the invention that the laminate from at least the first spunbonded layer and the second spunbonded layer or the laminate from at least the first spunbonded layer, the second spunbonded layer and the third spunbonded layer is calendered. After the individual spunbonded layers have been deposited, the entire laminate is, as it were, finally consolidated by at least one calender. The calendering is preferably carried out with a pressing surface proportion or welding surface proportion of the calender of 8% to 15%. It is within the scope of the invention that the calendering is carried out with a pressing surface proportion or welding surface proportion of the calender from 6% to 19%, preferably from 6% to 15% and preferably from 6% to 12%. It is recommended that the calender for calendering the laminate has a figure density of 10 to 50 figures/cm$^2$, preferably 10 to 40 figures/cm$^2$, preferably 10 to 35 figures/cm$^2$, particularly preferably 12 to 33 figures/cm$^2$ and very particularly preferably from 15 to 30 figures/cm$^2$. The recommended line pressure for calendering is in the range of 20 N/mm to 50 N/mm. It is within the scope of the invention that the surface temperature of at least one calender roll of the calender is 60° C. to 90° C. and preferably 65° C. to 85° C. By selecting the bonding pattern, the stiffness or the elasticity of the laminate in the machine direction (MD) and/or transverse to the machine direction (CD) can be influenced when the laminate is calendered. The surface temperature of the calender or the at least one calender roll of the calender is expediently lower than the melting temperature of the lowest melting component of the first spunbonded layer and/or the third spunbonded layer. The temperature difference between the surface temperature of the calender or the calender roll and the melting temperature of the lowest melting component of the first and/or the third spunbonded layer is preferably at least 60° C., preferably at least 65° C., preferably at least 70° C. and very preferably at least 75° C. It can thereby be achieved that in a later stretching process the filaments of the first spunbonded layer and/or the filaments of the third spunbonded layer are not torn out of their bonding points.

It is within the scope of the invention that the melting temperature of the elastomer of the second spunbonded layer is lower than the melting temperature of the lowest melting component of the first spunbonded layer and/or the third spunbonded layer. The invention is based on the discovery that the low-melting second spunbonded layer (core layer) forms, as it were, the bonding compound for the laminate. The filaments of the first and third spunbonded layers form only weak filament connection points with one another and thus additional freedom of movement is ensured during stretching of the laminate. It is only through this freedom of movement that the required elasticity is achieved when the laminate is optionally activated or stretched.

It is within the scope of the invention that the laminate is stretched from at least the first spunbonded layer and the second spunbonded layer or the laminate from at least the first spunbonded layer, the second spunbonded layer and the third spunbonded layer is stretched in the machine direction (MD) and/or in a transverse direction (CD). According to one embodiment of the method according to the invention, the stretching can thus be carried out inline immediately after the production of the laminate. According to another embodiment of the method according to the invention, stretching is carried out offline, preferably in another system or device. For example, the laminate made can be wound up, preferably after final consolidation or after calendering, and then later unwound and stretched in another system, for example in a diaper system. The laminate can be preheated before stretching.

According to an embodiment variant of the stretching process, the laminate can be stretched in the machine direction (MD) by at least one pair of toothed rollers with two toothed rollers that mesh and between which the laminate is passed. A plurality of teeth is distributed over the circumference of each toothed roller and the rows of teeth each extend parallel to the longitudinal axis of each toothed roller.

According to another embodiment variant, the laminate can be stretched in the machine direction (MD) by passing the laminate through the gap between at least two pairs of stretching rollers and by the second pair of stretching rollers or a pair of downstream stretching rollers having a higher rotational speed than the first pair of stretching rollers. It is also possible for a plurality of pairs of stretching rollers to be involved, the laminate being passed between the stretching rollers of a first pair of stretching rollers that is rotating at a first rotational speed. This is followed by at least one second pair of stretching rollers, through which the laminate is guided, this second pair of stretching rollers having a higher rotational speed of the stretching rollers than the first pair of stretching rollers. The second pair of stretching rollers can be followed by further pairs of stretching rollers that are traversed by the laminate. The rotational speed expediently decreases from the second pair of stretching rollers to the subsequent pairs of stretching rollers. The stretching rollers used can also be heated. The stretching distance when stretching with the pairs of stretching rollers is preferably 200 to 500 mm in the machine direction. According to one embodiment, the two stretching measures described above can be combined in the machine direction (MD).

Additionally or alternatively, the laminate, preferably the final consolidated or calendered laminate, can be stretched in the transverse direction (CD). This stretching is advantageously carried out transversely to the machine direction by at least one pair of transverse stretching rollers, between which the laminate is passed. It is recommended that both transverse stretching rollers have roller disks arranged alongside one another along their longitudinal axis and spaced from one another. The engagement of the roller disks in the laminate causes the laminate to be stretched in the transverse direction or transverse to the machine direction. Machine direction stretching (MD) can be combined with transverse direction stretching (CD).

To attain the inventive object, the invention further teaches a nonwoven laminate composed of at least two spunbonded layers, a first spunbonded layer having crimped multicomponent filaments or crimped bicomponent filaments, the crimped filaments preferably having a degree of crimp of more than 2.5 loops per cm of their length, preferably having more than 3 loops per cm of their length, wherein a second spunbonded layer with continuous filaments is provided, these continuous filaments of the second spunbonded layer having an elastomer based on polypropylene and wherein the polypropylene preferably has a mesopentad fraction (mmmm) of more than 70%, preferably more than 80% and preferably more than 90%.

According to a preferred embodiment of the nonwoven laminate according to the invention, the continuous filaments of the second spunbonded nonwoven are monocomponent filaments. According to an alternative embodiment, the continuous filaments of the second spunbonded nonwoven are bicomponent filaments that are preferably bicomponent filaments with a core-sleeve configuration, in particular with a coaxial core-sleeve configuration.

It is within the scope of the invention that the nonwoven laminate comprises a third spunbonded layer, this third spunbonded layer having crimped multicomponent filaments or crimped bicomponent filaments. These crimped filaments of the third spunbonded layer preferably have a degree of crimp of more than 2.5 loops per cm of their length, preferably of more than 3 loops per cm of their length. A particularly preferred embodiment of the invention is characterized in that the titer of the continuous filaments of the first spunbonded layer and/or of the continuous filaments of the third spunbonded layer is 1.0 to 2.0 den. The titer of the continuous filaments of the first spunbonded layer and/or of the continuous filaments of the third spunbonded layer is preferably 12 µm to 25 µm, preferably 14 µm to 20 µm and particularly preferably 16 µm to 18 µm.

It is within the scope of the invention that the nonwoven laminate has at least two, preferably at least three, second spunbonded layers. These second spunbonded nonwovens or these second spunbonded layers form two or three core layers between the first and third spunbonded layers, so that an at least four-layer or five-layered nonwoven laminate is formed.

The invention is based on the discovery that the method according to the invention can be used to produce a nonwoven laminate distinguished by an optimal combination of properties. On the one hand, this nonwoven laminate is sufficiently soft and also has excellent elastic properties. The nonwoven laminate is stretchable on the one hand and has sufficient elastic restoring forces on the other hand. Many elastic nonwovens or nonwoven laminates known from the prior art result in a rubber-like grip. In the context of the invention, this disadvantageous rubber-like grip can be avoided. The nonwoven laminate made according to the invention can be made in a relatively simple and inexpensive manner. The effort involved in the production is less than with many measures known from the prior art for making elastic nonwovens or elastic nonwoven laminates. The nonwoven laminates made according to the invention can be used as hygiene products and can be used, for example, in the area of figure-hugging underwear-like diaper and incontinence products.

BRIEF DESCRIPTION OF THE DRAWING

The above and other objects, features, and advantages will become more readily apparent from the following description, reference being made to the accompanying drawing in which:

FIG. 5A is a front view of an embodiment of a stretcher for elongating a nonwoven laminate according to the invention;

FIG. 5B is a side view of the stretcher of FIG. 5A;

FIG. 6A shows a section through a nonwoven laminate according to the invention in the unstretched state; and FIG. 6B shows the laminate of FIG. 6A in the partially stretched state, and FIG. 6C shows the laminate of FIG. 6A in the fully stretched state.

SPECIFIC DESCRIPTION OF THE INVENTION

Figure 1:
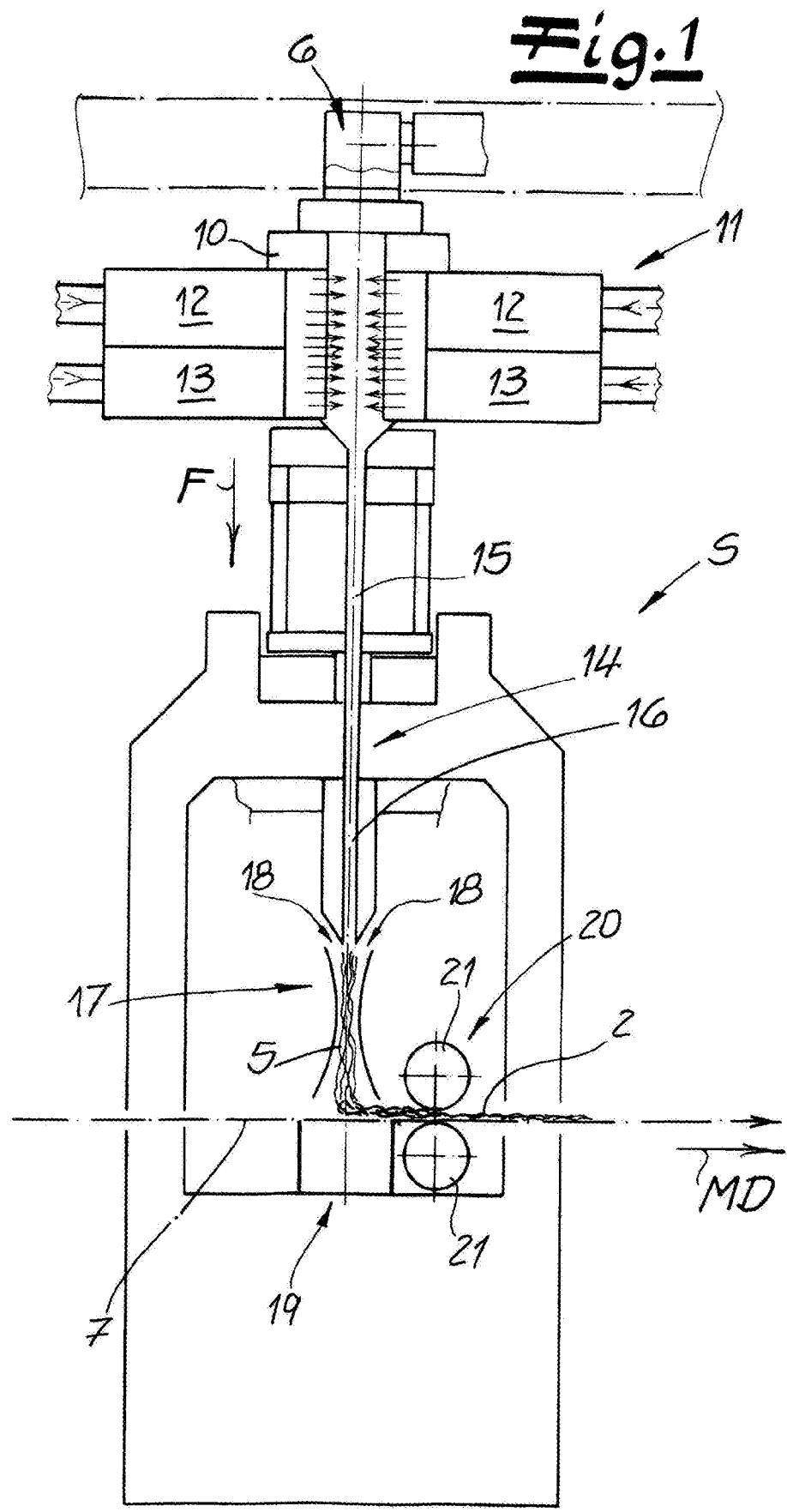
FIG. 1 is a vertical section through a preferred embodiment of a spinning system for making a spunbonded layer for the inventive nonwoven laminate.

As seen in FIG. 1 shows a particularly preferred embodiment of a spinning system for making the first, second, and third spunbonded nonwoven layers 2, 3, and 4 for a nonwoven laminate 1 according to the invention. For this purpose, continuous filaments 5 made of thermoplastic material are spun by a spinneret 6 and these continuous filaments 5 are ejected downward in a filament direction F from the spinneret 6 through a monomer extractor 10 for the suction of gases of the spinning process. In the travel direction F of the continuous filaments 5, a cooler 11 for cooling the continuous filaments 5 is preferably provided downstream of and below the monomer extractor 10. As recommended, this cooler 11 has an air supply cabin that in this embodiment is divided into two compartments 12 and 13 from which respective streams of process air or cooling air of different temperatures can preferably be directed at the descending filament bundle. A stretcher 14 is preferably connected downstream from the cooler 11 in the flow direction F. This stretcher 14 has an intermediate passage 15 converging downward in the flow direction F and opening downward into an adjoining stretching passage 16. According to a very preferred embodiment and here, the subassembly of the cooler 11 and the stretcher 14 is a closed system into which, apart from the supply of the cooling air to the cooler 11, no further air is admitted.

According to the invention, a diffuser 17 is downstream of the stretcher 14 in the flow direction F. Expediently, the continuous filaments 5 are deposited downstream of the diffuser 17 on a deposition device designed as a moving screen belt 7 for the spunbonded layers 2, 3, 4. Preferably, air inlet gaps 18 are formed between the stretcher 14 or the stretching passage 16 and the diffuser 17, through which air inlet gaps 18 air or secondary air is introduced into the diffuser 17.

According to a preferred embodiment, the deposition device of the spinning system S is designed as an air-permeable sieve belt 7. Preferably, suction air is drawn downward through the moving screen belt 7 from the underside of the moving screen belt 7 facing away from the spunbonded layer 2. For this purpose, at least one aspirator or suction device 19 is below the moving screen belt 7. The spunbonded layer 2 is preferably preconsolidated after it has been deposited, preferably by a preconsolidation calender 20 having two preconsolidation rolls 21. The spunbonded layer 2 is then conveyed further in the machine direction MD with the aid of the moving screen belt 7.

Figure 2:
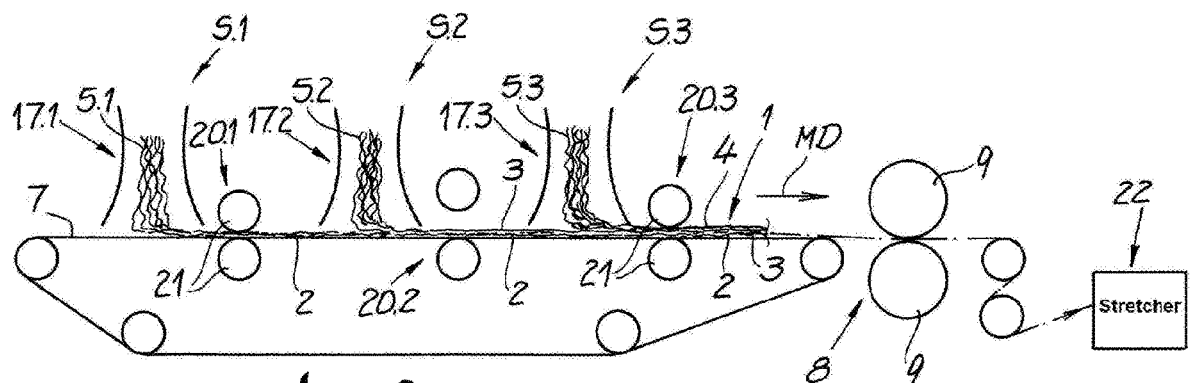
FIG. 2 is a side view of a preferred embodiment of an apparatus for making a nonwoven laminate according to the invention.

FIG. 2 shows a preferred embodiment of a device according to the invention for making a three-layer nonwoven laminate 1 from a first spunbonded layer 2, a second spunbonded layer 3 and a third spunbonded layer 4. The spunbonded layers 2, 3, 4 are each made with a respective spinning system S.1, S.2, and S.3 as shown in FIG. 1. For the sake of simplicity, only the diffusers 17.1, 17.2, and 17.3 of these spinning systems S are shown in FIG. 2. According to FIG. 2, continuous filaments 5 in the form of bicomponent filaments 5.1 are first made with the first spinning system S.1 on the left-hand side of FIG. 2 and deposited on the moving screen belt 7 as the first spunbonded layer 2. The bicomponent filaments 5.1 preferably have a side-by-side configuration in this embodiment and both components of these bicomponent filaments 5.1 are preferably homopolypropylenes. According to a recommended design variant, the homopolypropylenes of the two components of the bicomponent filaments 5.1 differ at least in their melt-flow rate (MFR). The melt-flow rate of one component is preferably at least 1.2 times, in particular 1.3 times greater than the melt-flow rate of the other component. The bicomponent filaments 5.1 are preferred and, in this embodiment, are crimped and expediently have a degree of crimp of more than 2.5 loops per cm of their length and particularly preferably of more than 3 loops per cm of their length. The first spunbonded layer 2 is, as is shown, preconsolidated by a preconsolidation calender 20.1 with two preconsolidation rolls 21.

In the machine direction MD, the first left-hand spinning system S.1 is followed by a middle spinning system S.2 that advantageously produces continuous filaments in the form of monocomponent filaments 5.2 that are deposited as the second spunbonded layer 3. According to the invention, these monocomponent filaments 5.2 of the second spunbonded nonwoven have an elastomer based on polypropylene. The monocomponent filaments 5.2 expediently consist of this elastomer or substantially of this elastomer. It is preferably an elastomer in the form of a copolymer of propylene and ethylene. It is recommended that this copolymer have a melting point between 50° C. and 160° C. The monocomponent filaments 5.2 are expediently uncrimped continuous filaments 5. A particularly preferred embodiment of the invention is characterized in that the polypropylene of the elastomer or the copolymer of the monocomponent filaments 5.2 has a mesopentad fraction (mmmm) of more than 90%. The monocomponent filaments 5.2 of the second spunbonded layer 3 preferably and, in this embodiment, have a titer of 25 μm to 40 μm. It is within the scope of the invention that the second spunbonded layer 3 is not preconsolidated. The partial laminate from the first spunbonded fabric layer 2 and the second spunbonded fabric layer 3 disposed thereon is then conveyed further in the embodiment with the moving screen belt 7 in the machine direction MD and specifically to the third spinning system S to the right in FIG. 2.

The third spinning system S.3 preferably makes continuous filaments 5 in the form of bicomponent filaments 5.3 and deposits them as a third spunbonded layer 4 on the second spunbonded layer 3 of the partial laminate. The bicomponent filaments 5.3 are preferably identical to the filaments 5.1, that is they are crimped bicomponent filaments 5.2 preferably having a degree of crimp of more than 2.5 loops per cm of their length, in particular of more than 3 loops per cm of their length. Preferably, the bicomponent filaments 5.3 have a side-by-side configuration and the two components of the bicomponent filaments 5.3 expediently consist of polypropylene, in particular homopolypropylene or substantially polypropylene, in particular substantially homopolypropylene. The two components of the bicomponent filaments 5.3 of the third spunbonded layer 4 expediently differ in their melt-flow rate (MFR). The melt-flow rate of one component is preferably at least 1.2 times, in particular at least 1.3 times greater than the melt-flow rate of the other component. After being deposited, the third spunbonded layer 4 is preferably s preconsolidated by a preconsolidation calender 20.3 with preconsolidation rolls 21. A middle consolidator 20.2 is shown, but with its rollers separated since it is not in use, being optional.

According to a particularly preferred embodiment, the laminate 1 comprising the first spunbonded layer 2, the second spunbonded layer 3 and the third spunbonded layer 4 is then calendered or finally consolidated by a calender 8 with rollers 9. The calender preferably and, in this embodiment, has a press area proportion of 8% to 15%. It is recommended that the laminate be calendered by a calender 8 with a figure density of 15 to 30 figures/cm². It has been proven that the surface temperature of at least one calender roll 9 of the calender 8 is 65° C. to 85° C. Following the calendering or final consolidation, the nonwoven laminate 1 is stretched according to a particularly preferred embodiment by a stretcher 22. According to one embodiment, the stretching by the stretcher 22 can take place immediately (inline) downstream of where the nonwoven laminate 1 is formed. However, it is also within the scope of the invention that the nonwoven laminate 1 is stretch (offline) in particular at a different location or in a different system. For this purpose, the nonwoven laminate 1 is expediently wound up after it has been made and later stretched in particular at another location with at least one stretcher 22.

Figure 3:
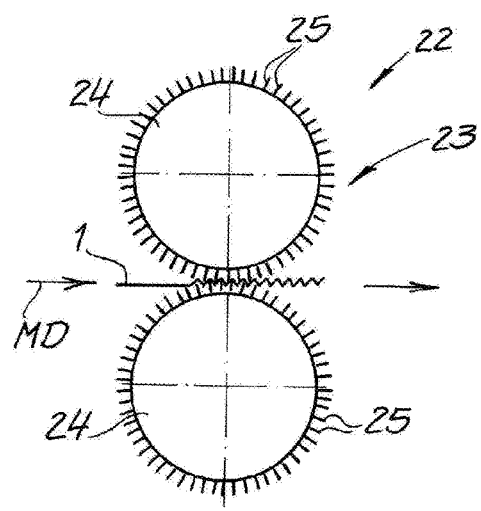
FIG. 3 is a view in the transverse direction of a first embodiment of a stretcher for elongating a nonwoven laminate of the invention.
Figure 4:
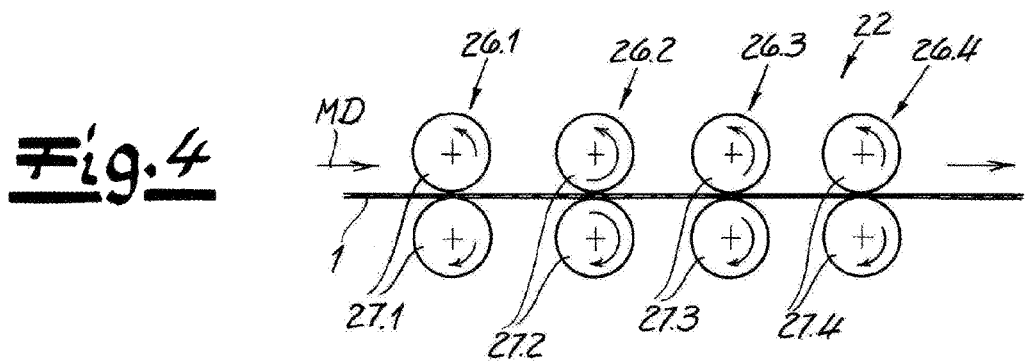
FIG. 4 is a view in the transverse direction of a second embodiment of a stretcher for elongating a nonwoven laminate according to the invention.

FIGS. 3 to 5 show preferred embodiments of a stretcher 22 for elongating the nonwoven laminate 1 made according to the invention. It is within the scope of the invention that two stretchers 22 or all three stretchers 22 can be combined with one another. In principle, only one of the stretchers 22 can also be used. The stretchers 22 shown in FIGS. 3 and 4 serve for elongating the nonwoven laminate 1 in the machine direction MD and the stretcher 22 shown in FIG. 5 serves for elongating the nonwoven laminate 1 transversely to the machine direction, that is to say in the direction CD.

The stretcher 22 shown in FIG. 3 for elongating the nonwoven laminate 1 in the direction MD consists of a pair 23 of two meshing toothed rollers 24. These two toothed rollers 24 each have a plurality of teeth 25 distributed over the circumference of each toothed roller 24 and these teeth 25 extend in rows parallel to the longitudinal axis of each toothed roller 24. The nonwoven laminate 1 is passed between the two toothed rollers 24 for longitudinal stretching, the teeth 25 of both toothed rollers 24 engaging in the nonwoven laminate 1.

FIG. 4 shows a further embodiment of a stretcher 22 for elongating the nonwoven laminate 1 in the direction MD. Preferably, according to FIG. 4, stretching roller pairs 26.1-26.4, each consisting of two stretching rollers 27.1-27.4, are provided, and the nonwoven laminate 1 is passed through the nip of the roller pairs 26.1-26.4. Expediently, a first pair of stretching rollers 26.1 with two stretching rollers 27.1 is provided, as well as a second pair of stretching rollers 26.2 with two stretching rollers 27.2. Preferably, the stretching rollers 27.2 of the second pair of stretching rollers 26.2 rotate at a higher rotational speed than the stretching rollers 27.1 of the first pair of stretching rollers 26.1, as a result of which the nonwoven laminate 1 is stretched. As recommended, a third pair of stretching rollers 26.3 with stretching rollers 27.3 and a fourth pair of stretching rollers 26.4 with stretching rollers 27.4 are provided. As shown, the rotational speed of the stretching rollers 27 drops from the second pair of stretching rollers 26.2 to the fourth pair of stretching rollers 26.4. In principle, further pairs of stretching rollers 26 can also be involved.

FIGS. 5A and 5B show a preferred embodiment of a stretcher 22 for elongating the nonwoven laminate 1 transversely to the machine direction, that is to say in the CD direction. For this purpose, at least one pair of transverse stretching rollers 28 is used that has two transverse stretching rollers 29. Each transverse stretching roller 29 has a plurality of roller disks 32 next to one another along their respective longitudinal axes and at a spacing a from one another. The nonwoven laminate 1 is passed between the two transverse stretching rollers 29 and by engagement of the roller disks 32 in the nonwoven laminate 1, the nonwoven laminate 1 is stretched in the transverse direction CD preferably and in this embodiment or transverse to the machine direction. Preferably, the transverse stretching rollers 29 are each constructed from a plurality of roller disks 32 next to one another. It is recommended that the thickness d of the roller disks 32 be 0.4 mm to 2 mm, preferably 0.5 mm to 1.8 mm and particularly preferably 0.6 mm to 0.8 mm. The spacing a between two roller disks 32 of a transverse stretching roller 29 is expediently less than 5 mm and preferably less than 3 mm, very preferably less than 2.5 mm and always less than the disk thickness. It is recommended that the overlap t of the two transverse stretching rollers 29 be 2 mm to 10 mm, preferably 3 mm to 9 mm and preferably 4 mm to 9 mm. A pair of transverse stretching rollers 28 with transverse stretching rollers 29 whose roller disks 32 have a thickness d of 0.5 mm to 0.9 mm and a mutual spacing a of 1.5 mm to 2.5 mm and an immersion depth t of 6 mm up to 8 mm, has proven particularly useful.

In FIGS. 6A-6C, the stretching of a nonwoven laminate 1 according to the invention is illustrated. FIG. 6A shows the nonwoven laminate 1 in the unstretched state. FIG. 6B shows the partial stretching of the nonwoven laminate 1. Finally, the maximum stretching of the nonwoven laminate 1 is shown in FIG. 6C.

Embodiment:

The invention is explained in more detail below with reference to an embodiment. According to a preferred embodiment, a nonwoven laminate 1 according to the invention has a first spunbonded layer 2, a second spunbonded layer 3 thereon and a third spunbonded layer 4 again thereon. The first and third spunbonded layers 2, 4 thus form outer layers or high-loft outer layers for the second spunbonded layer 3 as an elastic core layer. Appropriately, the continuous filaments 5 of the first spunbonded layer 2 and the third spunbonded layer 4 consist of bicomponent filaments 5.1, 5.3 with a side-by-side arrangement, and the continuous filaments 5 of the second spunbonded layer 3 preferably consist consist of monocomponent filaments 5.2. The bicomponent filaments 5.1 and 5.3 of the first spunbonded layer 2 and the third spunbonded layer 4 are crimped. As recommended, both the bicomponent filaments 5.1 of the first spunbonded layer 2 and the bicomponent filaments 5.3 of the third spunbonded layer 4 have a degree of crimp of more than 3 loops per cm of length.

As recommended, both the first component of the bicomponent filaments 5.1 of the first spunbonded layer 2 and the first component of the bicomponent filaments 5.3 of the third spunbonded layer 4 essentially consist of a homopolypropylene, preferably at least 95% by weight of this homopolypropylene. According to a particularly preferred embodiment variant, the first component of the bicomponent filaments 5.1 and 5.3 has 97 to 99% by weight of a homopolypropylene and 1 to 3% by weight of a lubricant, preferably a fatty-acid amide and particularly preferably 2% eurucic-acid amide. It is recommended that the melt-flow rate (MFR) of the first component of the bicomponent filaments 5.1 and the bicomponent filaments 5.3 is between 28 g/10 min and 42 g/10 min and preferably between 30 g/10 min and 40 g/10 min. Advantageously, the second component of the bicomponent filaments 5.1 of the first spunbonded layer 2 and the bicomponent filaments 5.3 of the third spunbonded layer 4 consists of a mixture of homopolypropylenes or substantially a mixture of homopolypropylenes. One homopolypropylene of this mixture preferably has a higher melt-flow rate (MFR) than the second homopolypropylene of this mixture. The mass ratio of the two homopolypropylenes in the mixture of the second component of the bicomponent filaments 5.1 and 5.3 is preferably 60:40 to 70:30, with the homopolypropylene with the higher mass proportion also preferably having the higher melt-flow rate (MFR). The second component of the bicomponent filaments 5.1 and the bicomponent filaments 5.3 expediently contains at least one additive, preferably in the form of a lubricant. Preferably 1% to 3% by weight of this additive or lubricant is present in the second component. The lubricant is preferably a fatty-acid amide and in particular an eurucic-acid amide. The mass ratio of the first component to the second component of the bicomponent filaments 5.1 and the bicomponent filaments 5.3 is preferably 60:40 to 80:20, preferably 65:35 to 75:25 and for example 70:30.

The monocomponent filaments 5.2 of the second spunbonded layer 3 expediently consist of a polypropylene-based elastomer. It is recommended that a copolymer of propylene and ethylene is used for the monocomponent filaments 5.2 of the second spunbonded layer 3, the propylene content preferably being more than 70% by weight and preferably more than 80% by weight. The elastomer of the monocomponent filaments 5.2 is particularly preferably a low-crystalline isotactic copolymer with a propylene or polypropylene component, the polypropylene having a mesopentad fraction (mmmm) of more than 90%.

Table 1 below shows parameters for a particularly preferred embodiment for making a nonwoven laminate 1 according to the invention. The nonwoven laminate 1 consists of three spunbonded layers 2, 3, 4. The bicomponent filaments 5.1 and 5.3 of the first spunbonded layer 2 and the third spunbonded layer 4 each have a first component in the form of a homopolypropylene 1. This first component can expediently have 2% by weight of eurucic-acid amide added as a lubricant. According to a preferred embodiment of the invention, the homopolypropylene 1 has a melt-flow rate of 36 g/10 min. The second component X2 of the bicomponent filaments 5.1 and the bicomponent filaments 5.3 of the first spunbonded layer 2 and the third spunbonded layer 4 consists of a mixture of the homopolypropylene 1 and a homopolypropylene 2. A component of the mixture therefore corresponds to homopolypropylene 1 of the first component X1. The mass ratio of homopolypropylene 1 to homopolypropylene 2 in the mixture may be 65:35. A lubricant in the form of eurucic-acid amide, for example in an amount of 2% by weight, can be added to the second component. The homopolypropylene 2 expediently has a melt-flow rate of 13 g/min. The mass ratio of the first component X1 to the second component X2 of the bicomponent filaments 5.1 and the bicomponent filaments 5.3 of the first spunbonded layer 2 and the third spunbonded layer 4 is 70:30. Monocomponent filaments made of an elastomer in the form of a copolymer of propylene and ethylene are used for the second spunbonded nonwoven layer 3. The proportion of propylene is expediently more than 80% by weight. The mesopentad fraction (mmmm) of polypropylene is more than 90%. In the last two columns of Table 1, particularly preferred values for the throughput in the spinneret 6 of the respective spinning system S are given, as well as the preferred cabin pressure in the respective spinning system S.

TABLE 1

| Spunbond layer | 1st Component | 2d Component | Mass ratio X1/x2 | Throughput [g/hole/min} | Cabin Pressure Pa |
|---|---|---|---|---|---|
| First | Homopolypropylene 1 | Homopolypropylene 1 + Homopolypropylene 2 | 70:30 | 0.32 | 3800 |
| Second | Elastomer | | | 0.75 | 2800 |
| Third | Homopolypropylene 1 | Homopolypropylene 1 + Homopolypropylene 2 | 70:30 | 0.32 | 3800 |

We claim:

1. A method of making a nonwoven laminate having at least two nonwoven layers, the method comprising the steps of:
    spinning, cooling, and stretching first crimped multicomponent filaments to form a first nonwoven web;
    depositing the first nonwoven web on a deposition device; and
    spinning, cooling, and stretching, second monocomponent continuous filaments consisting of only one elastomer based on polypropylene with a mesopentad fraction of more than 70% to form a second nonwoven web; and
    depositing the second nonwoven web on the first nonwoven web and thereby forming the nonwoven laminate.

2. The method according to claim 1, further comprising the step of:
    spinning, cooling, stretching, third crimped multicomponent filaments to form a third nonwoven web; and
    depositing the third nonwoven web on the second nonwoven web, whereby the laminate has three layers.

3. The method according to claim 2, further comprising the step of:
    spinning, cooling, and stretching a second set of the second continuous filaments including an elastomer based on polypropylene to form a second layer of the second nonwoven web; and
    depositing both of the second nonwoven webs atop the first nonwoven web such that the third nonwoven web can be deposited atop them.

4. The method according to claim 2, wherein the crimped filaments of the first spunbonded web or the third spunbonded web are formed as crimped filaments with side-by-side configuration or with a core-sleeve configuration.

5. The method according to claim 2, wherein the crimped filaments of the first spunbonded web or the third spunbonded web have at least one component based on polypropylene.

6. The method according to claim 2, wherein the crimped filaments of the first spunbonded web or the third spunbonded web have two components of polypropylene that differ in their melt-flow rate such the melt-flow rate of one component is preferably at least 1.2 times greater than the melt-flow rate of the other component.

7. The method according to claim 2, wherein the crimped filaments of the first spunbonded web or the third spunbonded web have a degree of crimp of more than 2.5 loops per cm of their length.

8. The method according to claim 1, wherein the continuous filaments of the second spunbonded woven web consist substantially of a copolymer of propylene and ethylene having a melting point between 50° C. and 170° C.

9. The method according to claim 1, wherein the continuous second filaments of the second spunbonded web are manufactured with a titer of 10 μm to 50 μm.

10. The method according to claim 1, further comprising the step of:
    calendering the laminate formed by the first spunbonded web and the second spunbonded web with a pressing surface portion or welding surface portion of the calender of 8% to 15%.

11. The method according to claim 10, wherein the calendering is effected by a calender with a figure density of 10 to 50 figures/cm$^2$.

12. The method according to claim 10, wherein the calendering is effected by a calender whose surface temperature is 60° C. to 90° C.

13. The method according to claim 1, further comprising the step of:
    stretching the laminate in a machine direction.

* * * * *